United States Patent Office 3,748,285
Patented July 24, 1973

3,748,285
COMPOSITION AND PROCESS FOR CLEANING
ION EXCHANGE RESINS
Donald G. Wiltsey, Park Forest, Alfred W. Oberhofer, Alsip, Richard E. Bloemke, River Grove, and Arnold Karklins, Chicago, Ill., assignors to Nalco Chemical Company, Chicago, Ill.
No Drawing. Continuation-in-part of abandoned application Ser. No. 19,469, Mar. 13, 1970. This application June 26, 1972, Ser. No. 266,034
Int. Cl. C11d 3/065
U.S. Cl. 252—531
3 Claims

ABSTRACT OF THE DISCLOSURE

A composition useful for cleaning ion exchange resin beds, comprising: (a) from 60 to 90% by weight of water; (b) from 0.5 to 4% of an unsubstituted, liquid aliphatic hydrocarbons having from 5 to 10 carbon atoms in chain length; (c) from 0 to 10.0% of a wetting agent selected from the group consisting of sulfated alcohols and sulfonated hydrocarbons and having from 6 to 22 carbon atoms in chain length; (d) from 5.0 to 15.0% of an organic compound having the formula $$R(OCH_2CH_2)_xOR$$

where R is independently selected from the group consisting of H, lower aliphatic radical of from 1 to 6 carbon atoms and radicals having the formula:

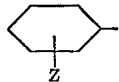

where Z is selected from the group consisting of H and aliphatic hydrocarbon radicals of from 4 to 18 carbon atoms, and $x$ is an integer of from 1 to 20; and (e) from 1 to 15% of an alkali inorganic phosphate, is disclosed. A process for using this composition is also disclosed.

This application is a continuation-in-part of application Ser. No. 19,469, filed Mar. 13, 1970, entitled, "A Composition and Process for Cleaning Ion Exchange Resins," in the names of Donald G. Wiltsey, Alfred W. Oberhofer, Richard E. Blomke and Arnold Karklins and now abandoned.

INTRODUCTION

Ion exchange resin beds often become oil-fouled. With the advent of condensate refining systems. It is probable that the question will be coming up more frequently. In the past, caustic and trisodium phosphate have been used with moderate success but there is a need for substantial improvement in the cleaning of these resins without any harmful effect to the resins.

It is an object of this invention to disclose a cleaning composition that can be used to clean ion exchange resins fouled with oil.

It is a further object to provide a cleaning composition that does not adversely affect the resins.

More specifically, it is an object of this invention to disclose a composition for cleaning cation exchange resins.

Another object is to provide a proces for cleaning ion exchange resins using the composition of this invention.

THE INVENTION

This invention consists of a unique composition of ingredients that has been found effective in cleaning ion exchange resins. This composition comprises: (a) from 60 to 90% by weight of water; (b) from 0.5 to 4% of an unsubstituted, liquid aliphatic hydrocarbon having from 5 to 10 carbon atoms in chain length; (c) from 0 to 10.0% of a wetting agent selected from the group consisting of sulfated alcohols and sulfonated hydrocarbons and having from 6 to 22 carbon atoms in chain length; (d) from 5.0 to 15.0% of an organic compound having the formula $R(OCH_2CH_2)_xOR$ where R is independently selected from the group consisting of H, lower aliphatic radical of from 1 to 6 carbon atoms and radicals having the formula:

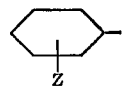

where Z is selected from the group consisting of H and aliphatic hydrocarbon radicals of from 4 to 18 carbon atoms, and $x$ is an integer of from 1 to 20; and (e) from 1 to 15% of an alkali inorganic phosphate.

More specifically, the composition comprises: (a) 77% water; (b) 2% hexane; (c) 7% dodecyl benzene sulfonic acid; (d) 4% glycol butyl ether; (e) 7% ethoxylated nonyl phenol having 10 moles of ethylene oxide; and (f) 3% trisodium phosphates.

The water acts as a carrier. The unsubstituted, liquid aliphatic hydrocarbon has from 5 to 10 carbon atoms in chain length. This hydrocarbon can be straight or branch-chained, saturated or unsaturated. Heptane, 1-heptene, octane, pentane, and isooctane are suitable examples. Preferably, hexane is the hydrocarbon used. The hydrocarbon acts to extract the oil. The wetting agent comprises well-known sulfated alcohols and sulfonated hydrocarbons having from 6 to 22 carbon atoms in chain length. This wetting agent acts as a detergent to remove the oil. The wetting agent also acts to form an emulsified composition that is relatively stable. The disadvantage in using these particular wetting agents is the fact that they foul anionic resins. Therefore, these particular wetting agents could not be used on such resins.

Incorporated in the cleaning formulation is an organic compound having the formula:

$$R(OCH_2CH_2)_xOR$$

where R is independently selected from the group consisting of H, lower aliphatic radicals having from 1 to 6 carbon atoms, and radicals having the formula:

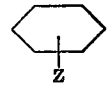

where Z is selected from the group consisting of H and aliphatic hydrocarbon radicals of from 4 to 18 carbon atoms, and $x$ is an integer of from 1 to 20. Any of the compounds fitting the above formula could be used alone or in combinations with other compounds fitting the formula. For example, preferably, glycol butyl ether and nonyl phenol ethoxylated with 10 moles of ethylene oxide are blended into the cleaning composition. A particularly preferred formulation contains 4% glycol butyl ether and 7% ethoxylated nonyl phenol with 10 moles of ethylene oxide. Other ethers could also be used. Instead of nonyl phenol, butyl phenol, for instance, could also be ethoxylated and used in the cleaning composition. These organic compounds act to extract the oil from the resins.

Lastly, an alkali inorganic phosphate is incorporated in the formulation to increase the cleaning efficiency and to complex the hardness that may be present and prevent precipitation. Preferably, the alkali inorganic phosphate is a sodium phosphate and more preferably is trisodium phosphate.

High pH is preferable since the oil is more soluble. The pH of this composition was approximately 11.9. The pH can range from about 8 to 13 and preferably is from about 11.5 to 12.

This composition is especially useful for cleaning sodium zeolite units or cationic condensate polishing units contaminated with oil.

The cleaning composition of the present invention may be utilized either at room temperature or at elevated temperatures, the latter having been found preferable for oil removal. Further, the present invention may be used in methods involving simple contacting of an ion exchange resin, preferably a cationic exchange resin with the components of the cleaning composition set out above. It has been found that cationic exchange resins in the sodium form are the preferred substrate or unit subject to cleaning as opposed to cationic units in alkaline earth form, such as magnesium or calcium, and a recovery of 40–50% of oil-fouled cationic resins has been accomplished by simple one-pass contacting at room temperatures utilizing a formulation such as generally described as Formulation 1 comprising 77% water, 2% hexane, 7% dodecyl benzene sulfonic acid, 4% glycol butyl ether, 7% ethoxylated nonyl phenol having 10 moles of ethylene oxide, and 3% trisodium phosphate as a cleaning composition utilized at a pH of 11.9. Sequential simple contacting enhances oil recovery appreciably. In addition, other alternative formulations noted broadly in the present description may be utilized. Although the composition may be used by simple contacting methods, a preferred method utilizable for ion exchange columns is set out below.

A preferred method for cleaning oil-fouled cation resins consists of the following steps:

(1) Backwash the resin bed thoroughly for 15 minutes.
(2) Preheat the resin by passing steam or one bed volume of hot water at 140° F. through the unit.
(3) Drain the water to the top of the bed.
(4) Fill the unit with one bed volume of a 10% cleaning solution and drain to the top of the bed at a flow rate that would take 30 minutes to drain. (0.25 gallon per cubic foot per minute).
(5) For small amounts of oil use a 5% solution at the same contact time and temperature.
(6) Fill the unit with one bed volume of fresh 10% solution of a cleaning solution and recirculate for a minimum of one-half hour.
(7) Drain the solution and backwash the resin bed for 15 minutes, preferably with hot water 120–140° F.
(8) Rinse and regenerate the resin before returning the unit back to service.

A composition consisting of Formulation 1 comprising 77% water, 2% hexane, 7% dodecyl benzene sulfonic acid, 4% glycol butyl ether, 7% ethoxylated nonyl phenol having 10 moles of ethylene oxide, and 3% trisodium phosphate was tested as a cleaning composition. The pH of Formulation 1 was 11.9. This formulation was found effective in removing oil from cation resins. Since this formulation contains sulfonic groups, it could not be used in mixed bed units or cation units which may be followed by an anion unit. Its use should be restricted to applications such as sodium zeolite softeners and condensate polishers using cation resins only.

Formulations eliminating the dodecyl benzene sulfonic acid could be used in anion resins.

Formulation 1 is a liquid condensate of chemical cleaners blended for safe and economical removal of grease, petroleum oils, fatty oils, carbon stains, and other substances from most surfaces. It readily penetrates the solid surface, emulsifying and dispersing the grease and/or oil-bound contamination so that it is easily rinsed off with fresh or salt water at normal pressures.

The extent of removal depends upon the way this reagent is applied. The resin may need a pretreatment to remove all the contaminants, such as iron, silica or slime, before the oil removal is done.

To fully understand this invention, the following examples are given.

EXAMPLES

A standard lubricating oil was passed through a cation exchange resin to form a contaminated resin. Although the excess oil was removed from these resins, the amount of oil left on the resin was higher than normally found on oil contaminated resins. Solutions of Formulation 1 were used containing 1%, 5%, and 10% by weight. They were applied at ambient temperature and at 140° F. Each treatment was followed by a known amount of water rinse at 140° F. The amount of oil left on the resin was determined by 1,1,1-tri-chloroethane extraction and drying on a hot plate.

The results are listed in Table I.

TABLE I.—OIL REMOVAL FROM CATION RESIN WITH FORMULATION 1

| Resin [1] | Treatment | Oil left on resin, lbs./cu. ft. | Observations | Percent oil removed |
|---|---|---|---|---|
| Dowex HCR | Oil contaminated (blank) | 10.2 | | |
| | One bed vol. of 1%, R.T. | 2.64 | Resin forms, clumps, some emulsion. | 74.2 |
| | One bed vol. of 5%, R.T. | 2.26 | Resin clumps, emulsion in column. | 77.9 |
| | One bed vol. of 1%, 140° F. | 1.34 | Some clumping white particles | 87.8 |
| | One bed vol. of 5%, 140° F. | 1.20 | White particles | 88.3 |
| | Two bed vol. of 5%, 140° F. | 1.31 | Some white particles | 87.1 |
| | One bed vol. of 10%, 140° F. | 1.15 | Clean, trace of white | 88.6 |
| | Two bed vol. of 10%, 140° F. | .125 | Clean | 98.8 |
| Dowex HCR-W | One bed vol. of 1%, R.T. | 2.55 | Resin clumps emulsion particles. | 75.0 |
| | One bed vol. of 5%, R.T. | 1.43 | Resin clumps emulsion formed | 86.0 |
| Dowex HCR-W | One bed vol. of 1%, 140° F. | 1.95 | Emulsion formed | 81.0 |
| | One bed vol. of 5%, 140° F. | .32 | Some emulsion [2] | 96.9 |
| Dowex HGR-W | One bed vol. of 1%, 140° F. | 1.90 | Some white emulsion | 81.5 |
| | One bed vol. of 5%, 140° F. | .83 | | 91.8 |

[1] These resins are commercially available cation exchange resins and are polystyrene cross-linked with divinyl benzene.
[2] Some loss of the extracted oil during evaporation.

The best results were obtained with a 10% solution of Formulation 1 at 140° F. Two bed volumes of 10% solution removed 98.8% of the oil. The next best removal was obtained with one bed volume of 5% solution at 140° F. It removed close to 90% of the total oil adsorbed on the resin. The 1% solution of Formulation 1 did not show as good a removal as the high concentrations.

SUMMARY

In summary, an effective cleaning composition for oil contaminated resins has been found. This composition removes the oil and other organic contaminants without adversely affecting the resins. A relatively easy method for using this composition is disclosed.

What is claimed and desired to be protected by Letters Patent is:

1. A method for cleaning cationic exchange resins using a composition consisting of:

(A) from 60 to 90% by weight of water;

(B) from 0.5 to 4% by weight of an unsubstituted, liquid aliphatic hydrocarbon having from 5 to 10 carbon atoms in chain length;

(C) from 0 to 10.0% of a wetting agent selected from the group consisting of sulfated alcohols and sulfonated hydrocarbons and having from 6 to 22 carbon atoms in chain length;

(D) from 5.0 to 15.0% of an organic compound having the formula $R(OCH_2CH_2)_xOR$ where R is independently selected from the group consisting of H, lower aliphatic radical of from 1 to 6 carbon atoms and radicals having the formula:

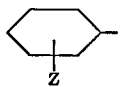

where Z is selected from the group consisting of H and aliphatic hydrocarbon radicals of from 4 to 18 carbon atoms, and $x$ is an ineger of from 1 to 20; and (E) from 1 to 15% of an alkali metal inorganic phosphate.

2. A method for cleaning cationic exchange resins using the composition of claim 1 in which the ethoxylated phenol has from 10 to 12 moles of ethylene oxide.

3. A method for cleaning cationic exchange resins using a composition consisting of:

(A) 77% water;
(B) 2% of hexane;
(C) 7% dodecyl benzene sulfonic acid;
(D) 4% glycol butyl ether;
(E) 7% ethoxylated nonyl phenol having 10 moles of ethylene oxide; and
(F) 3% trisodium phosphate.

References Cited
UNITED STATES PATENTS

| | | | |
|---|---|---|---|
| 3,501,373 | 3/1970 | Illingworth | 252—170 |
| 3,075,923 | 1/1963 | Berst et al. | 252—170 |
| 3,167,514 | 1/1965 | Baker | 252—171 |
| 3,367,878 | 2/1968 | Mankowich | 252—531 |
| 3,463,735 | 8/1969 | Stonebreaker et al. | 252—171 |
| 3,123,553 | 3/1964 | Abrams | 210—30 |
| 3,216,931 | 11/1965 | Dennis et al. | 210—30 |
| 3,420,774 | 1/1969 | Oehme et al. | 210—30 |
| 3,498,911 | 3/1970 | Kikuchi et al. | 26—30 |

WILLIAM E. SCHULZ, Primary Examiner

U.S. Cl. X.R.

134—25; 210—30; 252—171, 179